US012676135B2

(12) United States Patent
Gardtman et al.

(10) Patent No.: US 12,676,135 B2
(45) Date of Patent: Jul. 7, 2026

(54) SYSTEM, A METHOD AND A COMPUTER PROGRAM PRODUCT FOR SILENCING A PERSON

(71) Applicants: Ningbo Geely Automobile Research & Development Co., Ltd., Ningbo (CN); Zhejiang Geely Holding Group Co., Ltd., Zhejiang (CN)

(72) Inventors: Angelika Gardtman, Gothenburg (SE); Magnus Nilsson, Floda (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 174 days.

(21) Appl. No.: 18/605,468

(22) Filed: Mar. 14, 2024

(65) Prior Publication Data

US 2024/0221713 A1     Jul. 4, 2024

Related U.S. Application Data

(63) Continuation of application No. PCT/CN2022/120511, filed on Sep. 22, 2022.

(30) Foreign Application Priority Data

Oct. 6, 2021     (EP) ..................................... 21201275

(51) Int. Cl.
| | |
|---|---|
| *H04R 3/02* | (2006.01) |
| *G06V 40/16* | (2022.01) |
| *G10K 11/175* | (2006.01) |
| *G10L 25/78* | (2013.01) |
| *G10K 11/16* | (2006.01) |

(52) U.S. Cl.
CPC ........ *G10K 11/1754* (2020.05); *G06V 40/176* (2022.01); *G10L 25/78* (2013.01)

(58) Field of Classification Search
CPC ... G10K 11/1754; G06V 40/176; G10L 25/78
USPC ....................................... 381/74, 71.4, 73.1
See application file for complete search history.

(56) References Cited

U.S. PATENT DOCUMENTS

| | | | |
|---|---|---|---|
| 7,088,828 B1 | 8/2006 | Bradford et al. | |
| 10,095,918 B2 * | 10/2018 | Gil ...................... | G06V 40/176 |
| 2003/0158732 A1 * | 8/2003 | Pi .......................... | G01S 13/933 |
| | | | 704/E15.04 |

(Continued)

FOREIGN PATENT DOCUMENTS

| | | | | |
|---|---|---|---|---|
| CN | 1771760 A | * | 5/2006 | ............. H04R 25/70 |

OTHER PUBLICATIONS

Schmidt, Gerhard et al., "Signal processing for in-car communications systems," Elsevier, Signal Processing 86 (2006), Oct. 28, 2005, pp. 1307-1326.

(Continued)

*Primary Examiner* — Ammar T Hamid
(74) *Attorney, Agent, or Firm* — Tucker Ellis LLP

(57) ABSTRACT

A system for silencing a person includes a microphone configured to obtain sound of a first person, a speaker configured to playback sound to the first person, a processing circuitry connected to the microphone and the speaker and configured to obtain sound of the first person by the microphone, and play back the obtained sound of the first person with a predefined time delay by the speaker.

13 Claims, 3 Drawing Sheets

100

(56)     References Cited

U.S. PATENT DOCUMENTS

| | | | |
|---|---|---|---|
| 2009/0190770 A1* | 7/2009 | Kesterson | G10K 11/17857 |
| | | | 381/71.1 |
| 2016/0029111 A1 | 1/2016 | Wacquant et al. | |
| 2018/0115851 A1 | 4/2018 | Duong et al. | |
| 2019/0230437 A1 | 7/2019 | Hirano et al. | |
| 2020/0074154 A1 | 3/2020 | el Kaliouby et al. | |
| 2021/0107496 A1 | 4/2021 | Oboril et al. | |

OTHER PUBLICATIONS

Poschen, Silvia et al., "Wideband Echo Preception," Conference: 11th International Workshop on Acoustic Echo and Noise Control (IWAENC), Jan. 2008, 4 pages.

* cited by examiner

SYSTEM, A METHOD AND A COMPUTER PROGRAM PRODUCT FOR SILENCING A PERSON

RELATED APPLICATION DATA

This application is a continuation of International Patent Application No. PCT/CN2022/120511, filed Sep. 22, 2022, which claims the benefit of European Patent Application No. 21201275.1, filed Oct. 6, 2021, the disclosures of which are incorporated herein by reference in their entireties.

TECHNICAL FIELD

The present disclosure relates to a system, a method and a computer program product for discreetly silencing a person in a polite way, such as silencing a vehicle occupant in a vehicle to not disturb other vehicle occupants in the vehicle.

BACKGROUND

Talking, singing or whistling etc. may not always be socially accepted. There are occasions when persons are close to each other and it is expected and desired that every person is silent to not disturb others.

In an example, when travelling together in a shared vehicle you sometimes want the other persons to be silent. One reason is that you are sitting close to each other and it is therefore very easy to annoy each other by making sound, e.g. talking in a phone etc.

There are also vehicles and sections in vehicles that have silent compartments. A person that has e.g. pre-booked to travel in a silent compartment, expects it to be silent. However, there are unfortunately not all that respect to be silent and this can sometimes be disturbing to others.

Today you could ask a person to be quiet. There are also solutions to cancel noise and speech by active noise canceling headphones etc. However, this is not always a very practical solution.

SUMMARY

It is an object of the present disclosure to mitigate, alleviate or eliminate one or more of the above-identified deficiencies and disadvantages in the prior art and solve at least the above mentioned problem.

According to a first aspect there is provided a system for silencing a person. The system comprises a microphone configured to obtain sound of a first person, a speaker configured to playback sound to the first person, a processing circuitry connected to the microphone and the speaker and configured to obtain sound of the first person by the microphone and play back the obtained sound of the first person with a predefined time delay by the speaker.

One advantage with this first aspect is that when the first person hears his/her own voice played back with a small delay, like an echo, he/she will immediately cease talking since it is annoying. This is a discreet way of silencing the first person in a polite way without the need of someone else to ask the first person to be quiet.

According to some embodiments, the processing circuitry is further configured to determine if the obtained sound of the first person is above a predefined sound level.

One advantage with this embodiment is that sound below a certain predefined sound level can be allowed, e.g. whispering or talking with a low voice.

According to some embodiments, the predefined sound level is set dynamically based on the sound level of an ambient sound.

One advantage with this embodiment is that depending on the ambient sound, the predefined sound level is adjusted in order to adapt to allow a certain level of sound of the first person relatively to the ambient sound.

According to some embodiments, the processing circuitry is further configured to determine if the duration of the sound of the first person exceeds a predefined time.

One advantage with this embodiment is that the first person may be allowed to make sound during a predefined time that may not be considered as disturbing e.g. polite short phrases, or shortly answering the phone etc.

According to some embodiments, the system further comprises a camera configured to obtain an image of a second person, and the processing circuitry is connected to the microphone, the speaker and the camera and further configured to obtain an image of a facial expression of a second person by the camera and determine if the obtained facial expression of the second person corresponds to a predetermined facial expression associated with a first facial expression category.

One advantage with this embodiment is that it can be determined if the second person is making a facial expression that belongs to a first facial expression category such as a disapproving facial expression.

According to some embodiments, the processing circuitry is further configured to determine if the obtained facial expression of the second person is obtained while sound of the first person is obtained.

One advantage with this embodiment is that it can be determined if the obtained facial expression of the second person occurs while the first person is making a sound to e.g. determine if the sound the first person is making is approved or disapproved by the second person.

According to some embodiments, the processing circuitry is further configured to obtain sound of a second person by the microphone, and determine by sound recognition if the obtained sound of the second person corresponds to a predetermined sound associated with a first sound category.

One advantage with this embodiment is that it can be determined if the second person is making sound that belongs to a first sound category such as a disapproving sound.

According to some embodiments, the processing circuitry is further configured to determine a total time when sound is obtained from the first person, and determine when the total time of sound from the first person exceeds a predefined time period.

One advantage with this embodiment is that a cumulative time can be allowed for the first person to make sound, but not after the predefined time period.

According to a second aspect there is provided a method for silencing a person, the method comprising obtaining sound of a first person by a microphone and playing back the obtained sound of the first person with a predefined time delay by a speaker.

One advantage with this first aspect is that when the first person hears his/hers own voice played back with a small delay, like an echo, he/she will immediately cease talking since it is annoying. This is a discreet way of silencing the first person in a polite way without the need of someone else to as the first person to be quiet.

According to some embodiments, the method further comprises determining if the obtained sound of the first person is above a predefined sound level.

One advantage with this embodiment is that sound below a certain predefined sound level can be allowed, e.g. whispering or talking with a low voice.

According to some embodiments, the method further comprises determining if the duration of the sound of the first person exceeds a predefined time.

One advantage with this embodiment is that the first person may be allowed to make sound during a predefined time that may not be considered as disturbing e.g. polite short phrases, or shortly answering the phone etc.

According to some embodiments, the method further comprises obtaining an image of a facial expression of a second person by a camera and determining if the obtained facial expression of the second person corresponds to a predetermined facial expression associated with a first facial expression category.

One advantage with this embodiment is that it can be determined if the second person is making a facial expression that belongs to a first facial expression category such as a disapproving facial expression.

According to some embodiments, the method further comprises determining if the obtained facial expression of the second person is obtained while sound of the first person is obtained.

One advantage with this embodiment is that it can be determined if the obtained facial expression of the second person occurs while the first person is making a sound to e.g. determine if the sound the first person is making is approved or disapproved by the second person.

According to some embodiments, the method further comprises obtaining sound of a second person by the microphone and determining by sound recognition if the obtained sound of the second person corresponds to a predetermined sound associated with a first sound category.

One advantage with this embodiment is that it can be determined if the second person is making sound that belongs to a first sound category such as a disapproving sound.

According to a third aspect there is provided a computer program product comprising a non-transitory computer readable medium, having thereon a computer program comprising program instructions, the computer program being loadable into a processing circuitry and configured to cause execution of the method when the computer program is run by the processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION OF EXAMPLE EMBODIMENTS

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

When travelling together in a shared vehicle you sometimes want the other person, or persons, to be silent. One reason is that you are sitting close to each other and it is therefore very easy to annoy each other by making sound, e.g. talking in a phone etc.

There are also vehicles and sections in vehicles that have silent compartments. A person that has e.g. pre-booked to travel in a silent compartment, expects it to be silent. However, there are unfortunately not all that respect to be silent and this can sometimes be disturbing to others.

Today you could ask a person to be quiet. There are also solutions to cancel noise and speech by active noise canceling headphones etc. However this is not always a very practical solution.

There is a demand for a technical solution for silencing persons.

Figure 1:
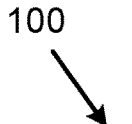
FIG. 1 illustrates an example system for silencing a person according to some embodiments of the present disclosure.

FIG. 1 illustrates an example system for silencing a person according to some embodiments of the present disclosure. FIG. 1 illustrates an example interior of a vehicle compartment with a first person 1 and a second person 2 travelling together. In the illustration in FIG. 1 there is one driver present, however this is for illustrative purpose only. It is understood that the first person 1 and the second person 2 may be travelling together in an autonomous vehicle for example.

The first aspect of this disclosure shows a system 100 for silencing a person. According to some embodiments the system 100 is a vehicle system. According to some embodiments the person is a vehicle occupant. According to some embodiments the system 100 is a vehicle system for silencing a vehicle occupant.

The system 100 comprises a microphone 10a, 10b, 10c, 10d configured to obtain sound of a first person 1.

According to some embodiments the sound is speech. According to some embodiments the sound is singing. According to some embodiments the sound is a whistling sound. According to some embodiments the sound is a guttural sound. According to some embodiments the sound is a snoring sound.

According to some embodiments the sound of the first person 1 is determined based on predefined sound data of a human to filter out the sound from a plurality of sounds.

According to some embodiments the sound of the first person 1 is determined based on determination of a recurrent sound within a predefined frequency spectrum corresponding to a frequency sound spectrum of a human. According to some embodiments the sound of the first person 1 is determined based on speech recognition.

According to some embodiments the microphone 10a, 10b, 10c, 10d is arranged close to where a person has a seat in the vehicle. According to some embodiments the microphone 10a, 10b, 10c, 10d is arranged at a head rest in order to be arranged close to the mouth of the first person 1. According to some embodiments, as illustrated in the FIG. 1, the microphone 10a, 10b, 10c is arranged in front of where a person has a seat in the vehicle.

Figure 2:
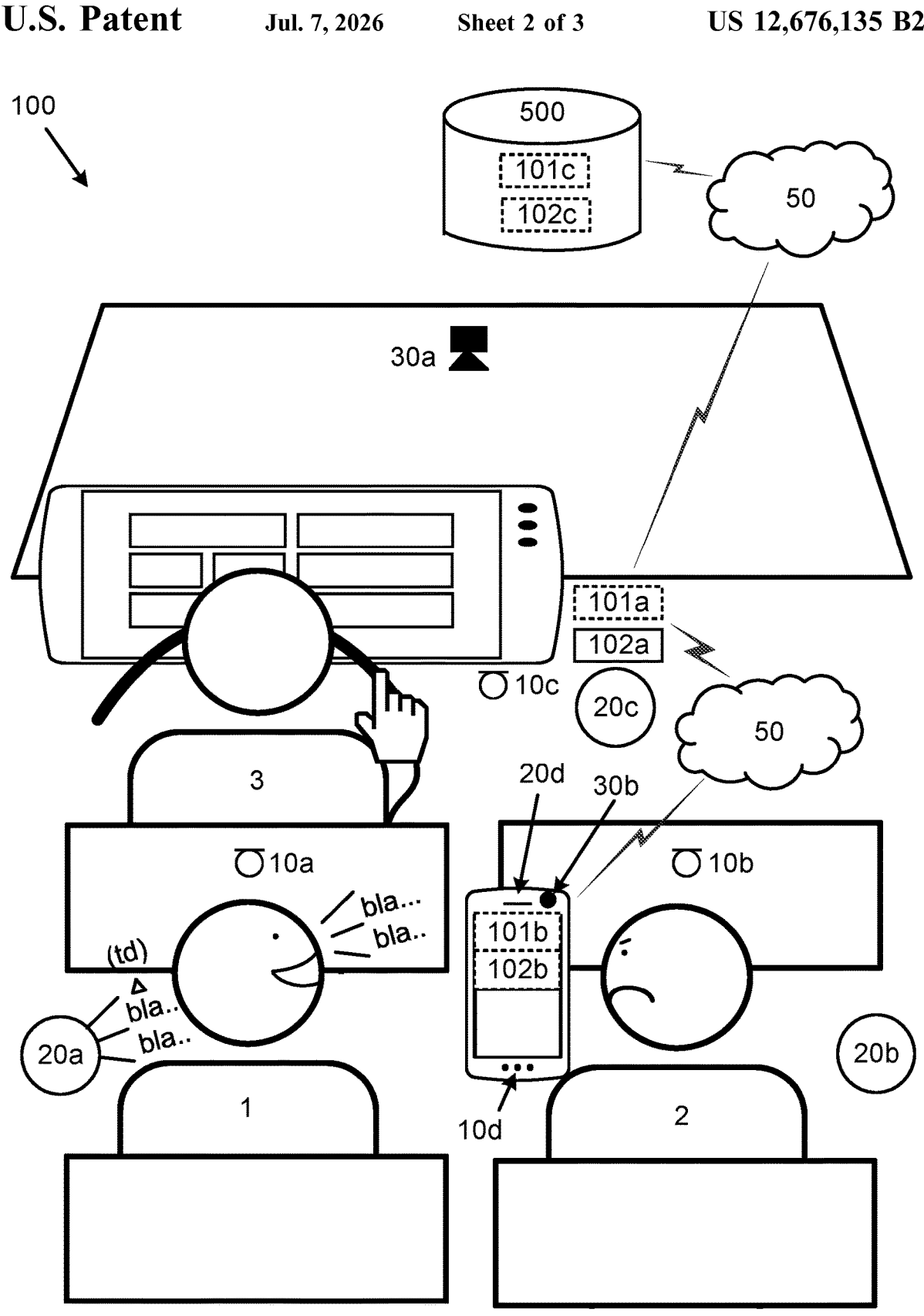
FIG. 2 illustrates an example system for silencing a person according to some embodiments of the present disclosure.

According to some embodiments the microphone 10d is a microphone of a portable electronic device as illustrated in FIG. 2. It is understood that the microphone 10a, 10b, 10c, 10d can be arranged at any location to obtain sound of the first person 1.

In an example the microphone 10a, 10b, 10c, 10d is a microphone installed in the vehicle that is also configured to be used for other purposes.

According to some embodiments the sound of the first person 1 is determined based on sound obtained by the microphone 10a, 10b, 10c, 10d that is arranged closest to the first person 1. According to some embodiments the microphone 10a, 10b, 10c, 10d is arranged at a predetermined position in a vehicle in order to determine from which seat position the sound is obtained from.

According to some embodiments the system 100 is configured to obtain sound from plural persons and determine different sounds from different persons. According to some embodiments the system 100 is configured to identify sound of a first person 1 and to identify sound of a second person 2. According to some embodiments the determination of different sounds of different persons is determined based on signal processing of the obtained sound.

The system 100 further comprises a speaker 20a, 20b, 20c, 20d configured to playback sound to the first person 1. According to some embodiments the speaker 20a, 20b, 20c, 20d configured to playback the picked up sound to the first person 1.

According to some embodiments the speaker 20a, 20b, 20c, 20d is arranged close to where a person has a seat in the vehicle. According to some embodiments the speaker 20a, 20b, 20c, 20d is arranged at a head rest in order to be arranged close to the mouth of the first person 1. According to some embodiments, as illustrated in the FIG. 1, the speaker 20a, 20b, 20c, 20d is arranged at the side of where a person has a seat in the vehicle.

According to some embodiments the speaker 20d is a speaker of a portable electronic device as illustrated in FIG. 2.

It is understood that the speaker 20a, 20b, 20c, 20d can be arranged at any location to playback sound to the first person 1. In an example the speaker 20a, 20b, 20c, 20d is a speaker installed in the vehicle that is also configured to be used for other purposes.

According to some embodiments the speaker 20a, 20b, 20c, 20d is arranged in a vehicle to play back sound at the same seat position where the microphone 10a, 10b, 10c, 10d picked up the sound of the first person 1. According to some embodiments the speaker 20a, 20b, 20c, 20d and the microphone 10a, 10b, 10c, 10d are arranged at the same seat position in a vehicle where the microphone 10a, 10b, 10c, 10d picked up the sound of the first person 1.

The system 100 further comprises a processing circuitry 102a, 102b, 102c connected to the microphone 10a, 10b, 10c, 10d and the speaker 20a, 20b, 20c, 20d.

According to some embodiments the processing circuitry 102a is the processing circuitry of an on-board vehicle computer as illustrated in FIG. 1.

According to some embodiments the processing circuitry 102b is comprised in a portable electronic device connectable to the system 100 via a communication network 50, as illustrated in FIG. 2.

According to some embodiments the processing circuitry 102c is comprised in a server 500 connectable to the system 100 via a communication network 50, as illustrated in FIG. 2.

According to some embodiments the system 100 further comprises a memory 101a, 101b, 101c configured to store data. According to some embodiments the memory 101a is the memory of an on-board vehicle computer as illustrated in FIG. 1.

According to some embodiments the memory 101b is comprised in a portable electronic device connectable to the system 100 via a communication network 50, as illustrated in FIG. 2.

According to some embodiments the memory 101c is comprised in a server 500 connectable to the system 100 via a communication network 50, as illustrated in FIG. 2.

According to some embodiments the communication network 50, as illustrated in FIG. 2, is a standardized wireless local area network such as a Wireless Local Area Network, WLAN, Bluetooth™, ZigBee, Ultra-Wideband, Near Field Communication, NFC, Radio Frequency Identification, RFID, or similar network.

According to some embodiments the communication network 50 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network.

According to some embodiments the communication network 50 is combination of a local area network and a wide area network. According to some embodiments the communication network 50 is a wired network. According to an aspect the communication network 50 is defined by common Internet Protocols.

According to some embodiments the processing circuitry 102a, 102b, 102c is configured to obtain sound of the first person 1 by the microphone 10a, 10b, 10c, 10d and play back the obtained sound of the first person 1 with a predefined time delay td by the speaker 20a, 20b, 20c, 20d.

In the illustrations in FIGS. 1 and 2 the obtained sound of the first person 1 is played back with a predefined time delay td by the speaker 20a that is in the vicinity of the first person 1.

According to some embodiments the time delay is a predefined time delay. According to some embodiments the time delay is a dynamic time delay that changes over time.

According to some embodiments the time delay is adapted to cause an echo effect at the first person when played back by the speaker 20*a*, 20*b*, 20*c*, 20*d*. According to some embodiments the time delay is between 50 ms-75 ms. One effect with the time delay is to cause the played back sound to be annoying and irritating to listen to by the first person 1 in order to silence the sound of the first person 1 such as ending a conversation, phone call or a whistling.

One advantage with this first aspect is that when the first person hears her/his own voice played back with a small delay, like an echo, he/she will immediately cease talking since it is annoying. This is a discreet way of silencing the first person in a polite way without the need of someone else to as the first person to be quiet.

According to some embodiments the system 100 is configured to play back sound to plural persons. According to some embodiments the system 100 is configured to play back sound of different persons in different speakers 20*a*, 20*b*, 20*c*, 20*d*.

According to some embodiments the system 100 is configured to identify sound from a first person 1 and to identify sound from a second person 2 and play back the obtained sound of the first person 1 with a predefined time delay td by a first speaker arranged at the first person 1 and play back the obtained sound of the second person 2 with a predefined time delay td by a second speaker arranged at the second person 2.

According to some embodiments the system is configured to determine the location of the person in a vehicle based on a determined sound level of the person at the microphone 10*a*, 10*b*, 10*c*, 10*d*. According to some embodiments the system is configured to determine the location of the person based on determined sound levels of the person at plural microphones 10*a*, 10*b*, 10*c*, 10*d*. One advantage with this embodiment is that it can be determined what speaker 20*a*, 20*b*, 20*c*, 20*d* that should be used for playing back the obtained sound of the person with the predefined time delay.

According to some embodiments the system 100 is activated based on a status parameter. According to some embodiments the system 100 is activated based on that the status parameter is indicative of a silent vehicle. According to some embodiments the status parameter is set by a person. In an example, a taxi vehicle or an autonomous vehicle is booked by at least one person that is paying extra for riding in silence in the taxi vehicle or the autonomous vehicle.

According to some embodiments the processing circuitry 102*a*, 102*b*, 102*c* is further configured to determine if the obtained sound of the first person 1 is above a predefined sound level. According to some embodiments the predefined sound level is a predefined threshold value corresponding to predetermined determined decibel, dB, value.

One advantage with this embodiment is that sound below a certain predefined sound level can be allowed, e.g. whispering or talking with a low voice.

According to some embodiments the predefined sound level is set dynamically based on the sound level of an ambient sound. In an example the ambient sound is increasing dependent of the speed of the vehicle and in order for the first person 1 to be able to be heard the first person needs to exceed a certain sound level that is correlated to the current ambient sound.

One advantage with this embodiment is that depending on the ambient sound, the predefined sound level is adjusted in order to adapt to allow a certain level of sound of the first person relatively to the ambient sound.

According to some embodiments the processing circuitry 102*a*, 102*b*, 102*c* is further configured to determine if the duration of the sound of the first person 1 exceeds a predefined time. According to some embodiments the duration of the sound is controlled by a timer that starts to count down as soon as a sound of the first person 1 has been determined.

One advantage with this embodiment is that the first person may be allowed to make sound during a predefined time that may not be considered as disturbing e.g. polite short phrases, or shortly answering the phone etc. In an example this will allow a person to have short conversations, or to answer or ask a question to a person without having sound to be played back with a certain delay.

According to some embodiments the system 100 further comprises a camera 30*a*, 30*b* configured to obtain an image of a second person 2.

According to some embodiments the camera 30*a*, 30*b* is arranged to obtain images of persons in a vehicle. According to some embodiments the camera 30*a*, 30*b* is arranged to obtain images of passengers in a vehicle.

According to some embodiments the camera 30*a*, 30*b* is arranged in front of a person in the vehicle to obtain image of the face of the person. According to some embodiments the camera 30*a*, 30*b* is configured to obtain image of the face of a second person 2. According to some embodiments, as illustrated in FIG. 2, the camera 30*b* is the camera of a portable electronic device.

According to some embodiments processing circuitry 102*a*, 102*b*, 102*c* is connected to the microphone 10*a*, 10*b*, 10*c*, 10*d*, the speaker 20*a*, 20*b*, 20*c*, 20*d* and the camera 30*a*, 30*b* and further configured to obtain an image of a facial expression of a second person 2 by the camera 30*a*, 30*b* and determine if the obtained facial expression of the second person 2 corresponds to a predetermined facial expression associated with a first facial expression category.

According to some embodiments the determination if the obtained facial expression of the second person 2 corresponds to a predetermined facial expression associated with a first facial expression category, is determined based on predetermined facial expression data of humans.

According to some embodiments the first facial expression category is associated with disapproving facial expressions. In example the second person looks angry, mad or exhausted.

According to some embodiments the first facial expression category is associated with a resting or sleeping facial expressions. In one example the second person is sleeping or resting with closed eyes.

According to some embodiments the first facial expression category is associated with busy facial expressions. In one example the second person is working or reading and is concentrated.

One advantage with this embodiment is that it can be determined if the second person is making a facial expression that belongs to a first facial expression category such as a disapproving facial expression.

According to some embodiments the camera 30*a*, 30*b* is used for determining what person that is making a sound. According to some embodiments the camera 30*a*, 30*b* is used for determining where the person that is making a sound is located in the vehicle.

According to some embodiments the camera 30*a*, 30*b* is used for determining where the person that is making a sound is located in the vehicle to determine what speaker 20*a*, 20*b*, 20*c*, 20*d* to use for playing back the obtained sound of the first person with the predefined time delay. In an example the first person 1 is moving around in the vehicle and the system 100 can determine what speaker 20*a*, 20*b*, 20c, 20d to use for playing back the obtained sound of the first person with the predefined time delay based on the location of the first 1 person in the vehicle.

According to some embodiments processing circuitry 102a, 102b, 102c is connected to the microphone 10a, 10b, 10c, 10d, the speaker 20a, 20b, 20c, 20d and the camera 30a, 30b and further configured to obtain an image of a facial expression of a third person 3 by the camera 30a, 30b and determine if the obtained facial expression of the second person 2 and the third person 3 correspond to a predetermined facial expression associated with the first facial expression category.

One advantage with this embodiment is that it can be determined if the second person and the third person are both making facial expressions that belongs to a first facial expression category such as a disapproving facial expression.

According to some embodiments the processing circuitry 102a, 102b, 102c is further configured to determine if the obtained facial expression of the second person 2 is obtained while sound of the first person 1 is obtained.

One advantage with this embodiment is that it can be determined if the obtained facial expression of the second person occurs while the first person is making a sound to e.g. determine if the sound the first person is making is approved or disapproved by the second person.

According to some embodiments the processing circuitry 102a, 102b, 102c is further configured to obtain sound of a second person 2 by the microphone 10a, 10b, 10c, 10d and determine by sound recognition if the obtained sound of the second person 2 corresponds to a predetermined sound associated with a first sound category.

According to some embodiments the determination by sound recognition if the obtained sound of the second person 2 corresponds to a predetermined sound associated with a first sound category is based on speech to text recognition. According to some embodiments the recognition of a predefined word, such as "silent", "quiet", "please", "shyyysh" etc., is determined as corresponding to a predetermined sound associated with a first sound category that is a disapproving sound category.

One advantage with this embodiment is that it can be determined if the second person is making sound that belongs to a first sound category such as a disapproving sound.

According to some embodiments the processing circuitry 102a, 102b, 102c is further configured to determine a total time when sound is obtained from the first person 1, and determine when the total time of sound from the first person 1 exceeds a predefined time period.

One advantage with this embodiment is that a cumulative time can be allowed for the first person to make sound, but not after the predefined time period. In an example the first person 1 is allowed to make sound during a total of three minutes while the first person 1 is in the vehicle. In an example the first person 1 is allowed to make sound during a total of three minutes every half hour while the first person 1 is in the vehicle.

According to some embodiments the total time when sound is obtained from the first person 1 is determined over a predetermined time period.

According to some embodiments the total time when sound is obtained from the first person 1 is determined based on that the first person 1 remains at a same position within the vehicle. According to some embodiments the total time when sound is obtained from the first person 1 is determined based on face recognition data obtained of the first person 1 by the camera 30a, 30b.

According to some embodiments the processing circuitry 102a, 102b, 102c is further configured to determine a total time when sound is obtained from the first person 1 and from the second person 2 by the microphone 10a, 10b, 10c, 10d, determine a total time when sound is obtained from each of the at least first person 1 and second person 2, and determine when the total time exceeds a predefined time period for each of the at least first person 1 and second person 2.

Figure 3:
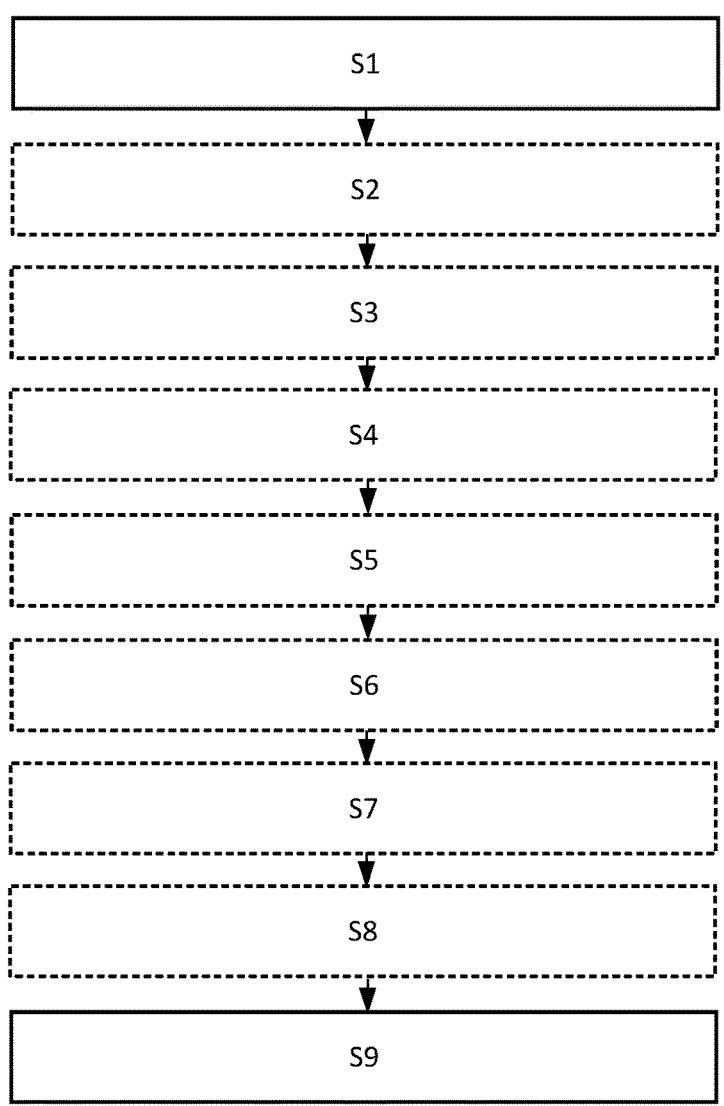
FIG. 3 illustrates a flow chart of the method steps according to the second aspect of the disclosure.
Figure 4:
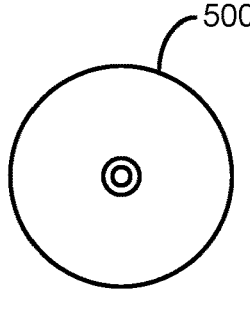
FIG. 4 illustrates a computer program product according to the third aspect of the disclosure.

FIG. 3 illustrates a flow chart of the method steps according to the second aspect of the disclosure.

The second aspect of this disclosure shows a method for silencing a person, the method comprising the step of S1 obtaining sound of a first person 1 by a microphone 10a, 10b, 10c, 10d, and the step of S9 playing back the obtained sound of the first person 1 with a predefined time delay td by a speaker 20a, 20b, 20c, 20d.

One advantage with this second aspect is that when the first person hears her/his own voice played back with a small delay, like an echo, he/she will immediately cease talking since it is annoying. This is a discreet way of silencing the first person in a polite way without the need of someone else to as the first person to be quiet.

According to some embodiments the method further comprises the step of S2 determining if the obtained sound of the first person 1 is above a predefined sound level.

One advantage with this embodiment is that sound below a certain predefined sound level can be allowed, e.g. whispering or talking with a low voice.

According to some embodiments the method further comprises the step of S3 determining if the duration of the sound of the first person 1 exceeds a predefined time.

One advantage with this embodiment is that the first person may be allowed to make sound during a predefined time that may not be considered as disturbing e.g. polite short phrases, or shortly answering the phone etc.

According to some embodiments the method further comprises the step of S4 obtaining an image of a facial expression of a second person 2 by a camera 30a, 30b, and S5 determining if the obtained facial expression of the second person 2 corresponds to a predetermined facial expression associated with a first facial expression category.

One advantage with this embodiment is that it can be determined if the second person is making a facial expression that belongs to a first facial expression category such as a disapproving facial expression.

According to some embodiments the method further comprises the step of S6 determining if the obtained facial expression of the second person 2 is obtained while sound of the first person 1 is obtained.

One advantage with this embodiment is that it can be determined if the obtained facial expression of the second person occurs while the first person is making a sound to e.g. determine if the sound the first person is making is approved or disapproved by the second person.

According to some embodiments the method comprises the step of S7 obtaining sound of a second person 2 by the microphone 10a, 10b, 10c, 10d, and the step of S8 determining by sound recognition if the obtained sound of the second person 2 corresponds to a predetermined sound associated with a first sound category.

One advantage with this embodiment is that it can be determined if the second person is making sound that belongs to a first sound category such as a disapproving sound.

The third aspect of this disclosure shows a computer program product the second aspect comprising a non-transitory computer readable medium, having thereon a computer program comprising program instructions, the computer program being loadable into a processing circuitry 102a, 102b, 102c and configured to cause execution of the method when the computer program is run by the processing circuitry 102a, 102b, 102c.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claims, from a study of the drawings, the disclosure, and the appended claims.

What is claimed is:

1. A vehicle system for a vehicle for silencing a person, the vehicle system comprises: a microphone configured to obtain sound of a first person, wherein the first person is a vehicle occupant; a speaker configured to playback sound to the first person, wherein the speaker and/or microphone are installed in the vehicle; a processing circuitry connected to the microphone and the speaker and configured to:—obtain sound of the first person by the microphone;—determine if the obtained sound of the first person is above a predefined sound level; and—play back the obtained sound of the first person with a predefined time delay by the speaker if the sound of the first person is above the predefined sound level.

2. The monitoring system according to claim 1, wherein the predefined sound level is set dynamically based on the sound level of an ambient sound.

3. The system according to claim 1, wherein the processing circuitry is further configured to:—determine if the duration of the sound of the first person exceeds a predefined time.

4. The system according to claim 1, wherein the system further comprises: a camera configured to obtain an image of a second person; and the processing circuitry is connected to the microphone, the speaker and the camera and further configured to:—obtain an image of a facial expression of a second person by the camera; 2and—determine if the obtained facial expression of the second person corresponds to a predetermined facial expression associated with a first facial expression category.

5. The system according to claim 4, wherein the processing circuitry is further configured to:—determine if the obtained facial expression of the second person is obtained while sound of the first person is obtained.

6. The system according to claim 1, wherein the processing circuitry is further configured to:—obtain sound of a second person by the microphone; and—determine by sound recognition if the obtained sound of the second person corresponds to a predetermined sound associated with a first sound category.

7. The system according to claim 1, wherein the processing circuitry is further configured to:—determine a total time when sound is obtained from the first person; and—determine when the total time of sound from the first person exceeds a predefined time period.

8. A method for silencing a person in a vehicle, the method comprising:—obtaining sound of a first person by a microphone wherein the first person is a vehicle occupant;—determining if the obtained sound of the first person is above a predefined sound level by the processing circuitry connected to the microphone and a speaker; and—playing back the obtained sound of the first person with a predefined time delay by a speaker if the sound of the first person is above a predefined sound level.

9. The method according to claim 8, further comprising:—determining if the duration of the sound of the first person exceeds a predefined time.

10. The method according to claim 8, further comprising:—obtaining an image of a facial expression of a second person by a camera; and—determining if the obtained facial expression of the second person corresponds to a predetermined facial expression associated with a first facial expression category.

11. The method according to claim 10 further comprising:—determining if the obtained facial expression of the second person is obtained while sound of the first person is obtained.

12. The method according to claim 8, further comprising:—obtaining sound of a second person by the microphone; and—determining by sound recognition if the obtained sound of the second person corresponds to a predetermined sound associated with a first sound category.

13. A non-transitory computer readable medium, having stored thereon a computer program comprising program instructions, the computer program being loadable into a processing circuitry and configured to cause execution of the method according to claim 8 when the computer program is run by the processing circuitry.

* * * * *